United States Patent
O'Brien et al.

(10) Patent No.: US 9,586,557 B2
(45) Date of Patent: Mar. 7, 2017

(54) REMOTELY LOCKABLE SEAT BELT BUCKLE

(71) Applicants: David John O'Brien, Cherrybrook (AU); Kenneth Hugh Dibble, Dural (AU)

(72) Inventors: David John O'Brien, Cherrybrook (AU); Kenneth Hugh Dibble, Dural (AU)

(*) Notice: Subject to any disclaimer, the term of this patent is extended or adjusted under 35 U.S.C. 154(b) by 131 days.

(21) Appl. No.: 14/364,603

(22) PCT Filed: Dec. 10, 2012

(86) PCT No.: PCT/AU2012/001512
§ 371 (c)(1),
(2) Date: Jun. 11, 2014

(87) PCT Pub. No.: WO2013/086562
PCT Pub. Date: Jun. 20, 2013

(65) Prior Publication Data
US 2015/0135493 A1    May 21, 2015

(30) Foreign Application Priority Data
Dec. 12, 2011   (AU) .............................. 2011905155

(51) Int. Cl.
| | | |
|---|---|---|
| B60R 22/00 | (2006.01) | |
| B60R 22/10 | (2006.01) | |
| B60R 22/48 | (2006.01) | |
| A44B 11/25 | (2006.01) | |

(52) U.S. Cl.
CPC ........ *B60R 22/105* (2013.01); *A44B 11/2523* (2013.01); *A44B 11/2573* (2013.01); *B60R 22/48* (2013.01); *A44D 2203/00* (2013.01); *B60R 2022/4816* (2013.01);
(Continued)

(58) Field of Classification Search
CPC ............ A44B 11/2565; A44B 11/2523; A44B 11/2573; A44B 11/2569; Y10T 24/45466; Y10T 24/45623; Y10T 24/45602; Y10T 24/45461; Y10T 24/45644; Y10T 24/45639; B60R 2022/4883; B60R 2022/4816;
(Continued)

(56) References Cited

U.S. PATENT DOCUMENTS

| | | | | |
|---|---|---|---|---|
| 5,182,836 A | * | 2/1993 | Burkat ............... | A44B 11/2573 24/603 |
| 5,274,890 A | * | 1/1994 | Shimizu .............. | A44B 11/2511 24/603 |

(Continued)

FOREIGN PATENT DOCUMENTS

WO    2004089705    10/2004

OTHER PUBLICATIONS

International Search Report for PCT/AU2012/001512, Completed by the Australian Patent Office on Feb. 13, 2013, 6 Pages.

*Primary Examiner* — Jack W Lavinder
(74) *Attorney, Agent, or Firm* — Brooks Kushman P.C.

(57) ABSTRACT

A seat belt buckle for engaging a latch inserted into buckle and retained in a latched mode until released by depressing a press release button. In a locked mode, with the vehicle ignition switch ON and the latch inserted into buckle, a complementary lock is activated preventing press the release button from effecting release of latch from buckle.

18 Claims, 7 Drawing Sheets

(52) U.S. Cl.
CPC ... *B60R 2022/4883* (2013.01); *Y10T 24/4566* (2015.01); *Y10T 24/45466* (2015.01); *Y10T 24/45602* (2015.01)

(58) Field of Classification Search
CPC ..... B60R 22/48; B60R 22/325; B60R 22/105; A44D 2203/00
See application file for complete search history.

(56) References Cited

U.S. PATENT DOCUMENTS 5,749,130 A * 5/1998 Bilyeu ............... A44B 11/2565
24/602
6,431,652 B1 8/2002 Kennedy

* cited by examiner

LOCKING PLATE 250
IN LOCKED POSITION

LOCKING PLATE 250
IN OFF POSITION

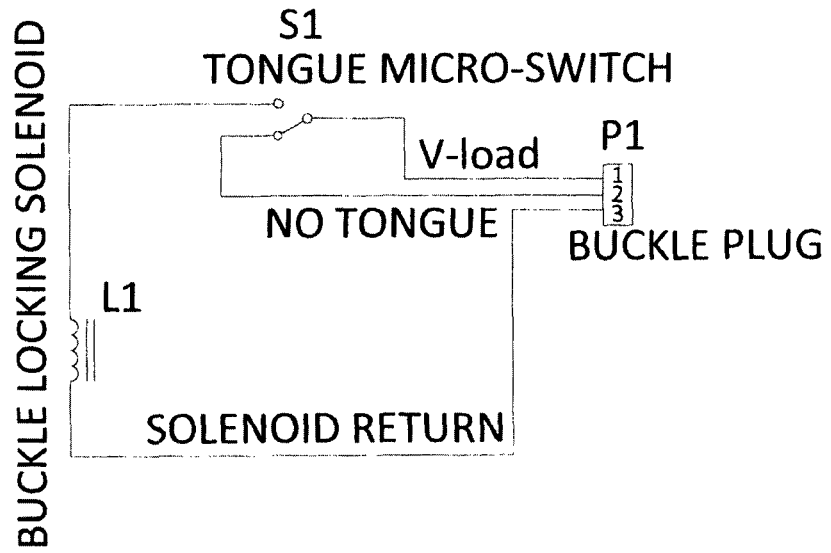
FIG - 5  ONE OF 3 BUCKLES SHOWN

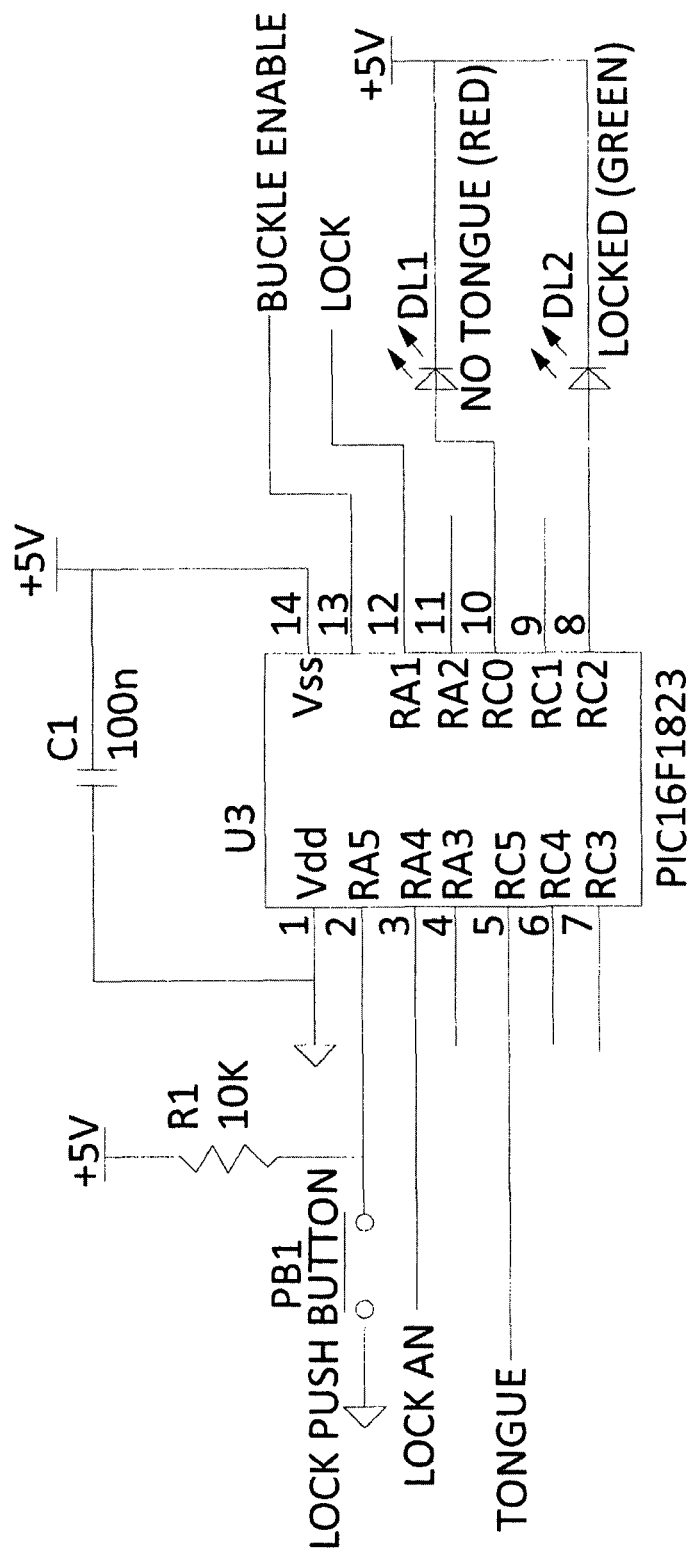
FIG - 6    MICRO-CONTROLLER

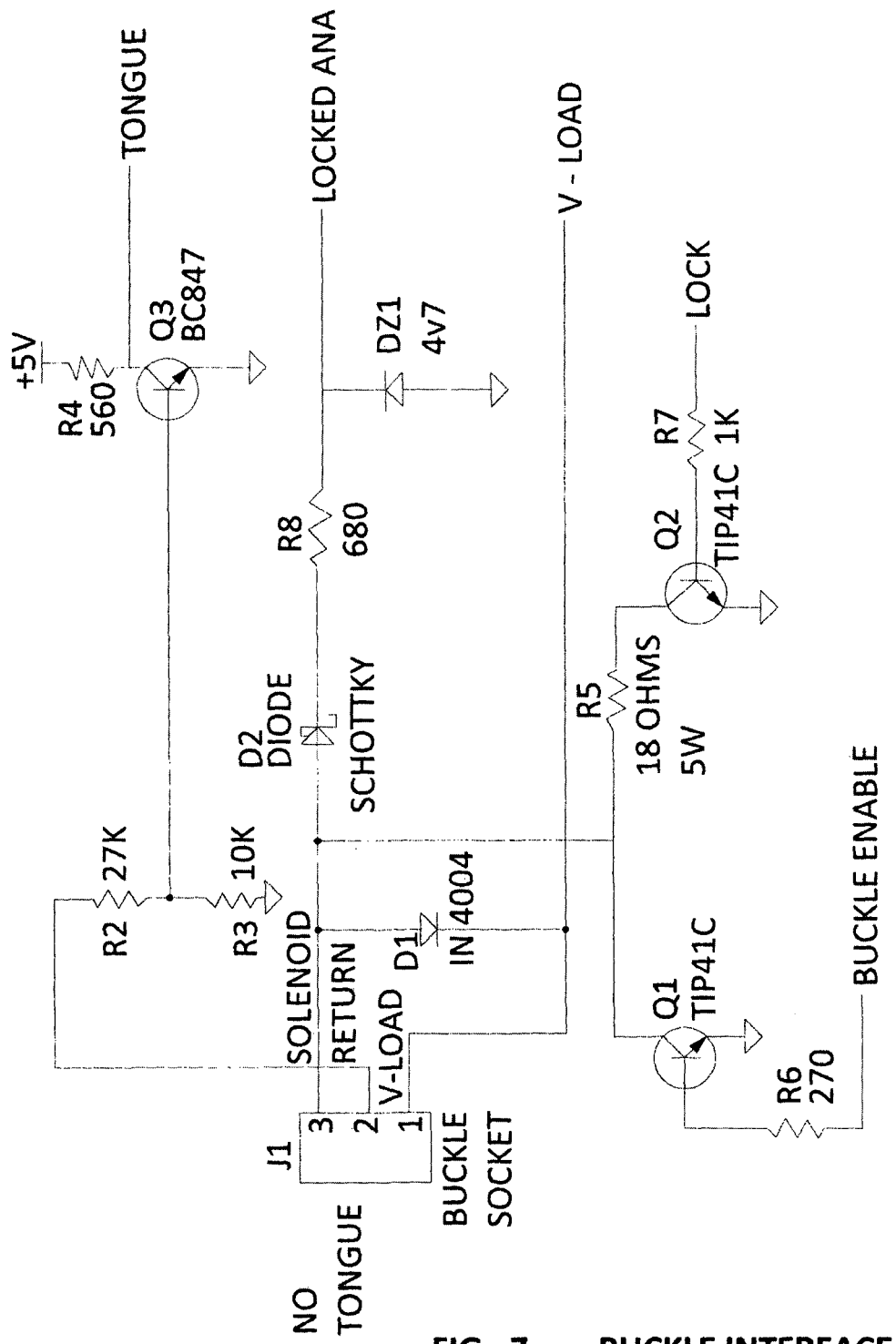
FIG - 7    BUCKLE INTERFACE

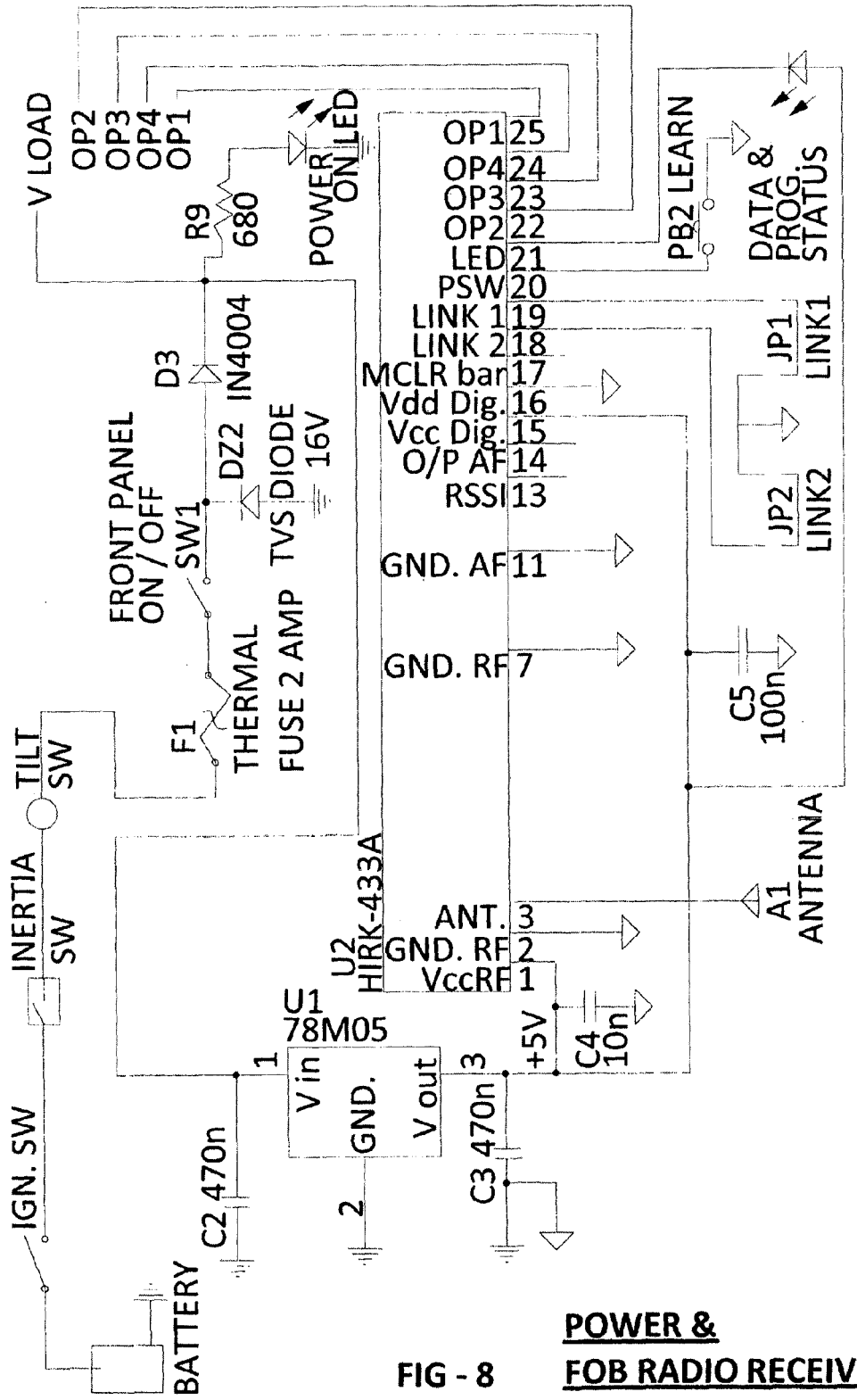
FIG - 8    POWER & FOB RADIO RECEIVER

REMOTELY LOCKABLE SEAT BELT BUCKLE

CROSS-REFERENCE TO RELATED APPLICATION

This application is the U.S. national phase of PCT Application No. PCT/AU2012/001512 filed on Dec. 10, 2012, which claims priority to Australian Patent Application No. 2011905155 filed on Dec. 12, 2011, the disclosures of which are incorporated in their entirety by reference herein.

FIELD OF THE INVENTION

The present invention relates to the field of passenger restraints and, in particular to a driver operated lockable seat belt arrangement suitable for use in a passenger vehicle.

BACKGROUND

FIG. 1 shows an example of a conventional seat belt arrangement 10 having a latch plate 20 and a buckle 30. The latch plate 20 and buckle 30 are typically configured such that the latch plate 20 is received in a recess 50 of the buckle 30 and engages therein to form a locking relationship with respect to the buckle 30.

A problem with the above arrangement is that a release button 40 of the buckle 30 can be easily pressed, for example by a child, to disengage the latch plate 20 from the buckle 30. This can be dangerous if a vehicle that such a child is travelling in stops suddenly whilst the child is unsecured. Further, such a conventional arrangement can be dangerous if a child releases themselves and then exits the vehicle whilst the vehicle is moving or exits the vehicle when stationary, into the path of another vehicle passing by.

In order to address the above problem, one known seat belt arrangement comprises a buckle cover (not shown) that attaches to a buckle such as the buckle 30 and covers the release button 40 in order to prevent a passenger, such as a child from pressing the release button 40 and disengaging the latch plate 20.

A problem with the above buckle cover, however, is that the cover can sometimes be removed from the buckle 30 by a child allowing the child access to the buckle 30 and the release button 40. Another disadvantage of the above buckle cover is that the cover remains on the buckle such that the buckle is still locked when a vehicle engine is switched off and thus, potentially can become an impediment to the passenger being released in the event of an accident.

Another known seat belt arrangement is disclosed in U.S. Pat. No. 6,431,652.

This seat belt arrangement comprises a main body and a plate and is configured to attach and cover a traditional buckle.

The plate can only be operated by compressing two locking cylinders located on the lateral sides of the main body. The locking cylinders can be electrically connected to the door locking system of a vehicle, Whilst the doors of the vehicle are locked the plate is unable to be released from the buckle. However when a door of the vehicle is unlocked, the plate is able to be released.

One disadvantage of this arrangement is that the main body and plate that cover the buckle are too cumbersome and bulky, because of that reason alone it would never be allowed to be fitted to today's vehicles.

Thus a need clearly exists for an improved seat belt arrangement that first has to comply with the vehicle safety standards of today. It should look and operate like a normal seat belt arrangement and at all times can be used as such, but it will be a system that has a locking option fitted to it, so that it can be used to safely transport persons with special needs, for example, persons for whatever reason tend to unbuckle their seat belts whilst the vehicle is in motion.

SUMMARY

It is an object of the present invention to substantially overcome, or at least ameliorate, one or more disadvantages of existing arrangements.

In accordance with one aspect of the present invention there is provided a seat belt arrangement comprising;

Buckle means configured to secure a latching plate when said latching plate is engaged with said buckle;

Release means associated with said buckle and being configured to allow release of said latching from engagement with said buckle upon activation of said release means;

Locking means operatively associated with said buckle and said release means, said locking means being configured to prevent activation of said release means in a first position and to allow activation of said release means in a second position, said first position being determined through activation of a remote activation means; and override means configured to allow activation of said release means whensaid remote activation means is activated.

Preferably, said locking means comprises at least one magnetising means being operatively associated with at least one magnetic locking plate, such that upon activation of said remote activation means is energised such that said magnetic locking plate configures said locking means in said first position.

In addition, a biasing means is preferably configured to locate the magnetic locking plate to the second position upon de-energising said magnetising means.

Advantageously, said remote activation means is in the form of a remote switch configured within a vehicle that has the seat belt arrangement installed.

Indication means preferably indicates whether said locking means is in first position or second position Preferably said magnetic locking plate moves to said second position upon opening a main power switch after engine is operating of said vehicle.

In accordance with another aspect of the present invention there is provided a seat belt arrangement comprising;

Buckle means configured to secure a latching when said latching plate is engaged with said buckle;

Release means associated with said buckle and being configured to allow release of said latching plate from engagement with said buckle upon activation of said release means; and locking means substantially configured within a periphery of said buckle means, said locking means being operatively associated with said buckle means and said release means so as to prevent activation of said release means in a first position and to allow activation of said release means in a second position, said first position being determined through activation of a remote activation means.

DETAILED DESCRIPTION AND BEST MODE

Disclosed herein is a restraint FIG. 1 comprising a buckle 30 configured to secure a latch 20 when said latch 20 is engaged with said buckle 30. The restraint also comprises a complementary lock (240/250/260/270) as in FIG. 2,3.4 associated with buckle 30. That is configured to prevent release of latch 20 from engagement with buckle 30, in a first position and to allow release of latch 20 from engagement with buckle 30 in a second position. FIGS. 2.3a.3b show a buckle 200 to embodiment of the present invention comprises a release button 220, a solenoid 240, a locking plate 250, chassis 230, return spring 270, a plastic casing 210 (shown by a broken line—FIG. 2) is used to conceal any moving parts of the buckle 200. The buckle further comprises a mounting bracket 60—FIG. 1 secured to chassis 230. Chassis 230 forms an opening 50—FIG. 1 with casing 210 to accept latch plate 20. Solenoid 240 associated with buckle 30 and said lock 250 being configured to prevent lock 250 being moved from said second position when solenoid 240 is in a first state and to allow lock 250 to be moved in a second state, said first state being determined through activation of a remote activator (driver controlled switch—FIG. 8). This switch is part of the dashboard control box comprising electronics programmed to deliver an initial 12v to the said complementary lock FIG. 2 (on switch activation) then sets at 3v to hold the solenoid 240 in a first state. This 3v setting delivers very low heat dissipation and a low current for a indefinite locked period. The electronics FIGS. 5,6,7,8 have the built-in capability of remote (fob type transmitter) controlling and multi buckling signalling via a receiver fitted to the control box. The inclusion of a micro switch 280 (normally open) in buckle 30 is positioned so that when latch 20 is inserted in said buckle 30 said latch 20 activates said micro switch 280 to a closed configuration passing current to said solenoid 240 moving said locking plate 250 from a second state to a first and thus locking said latch 20 into buckle 30 preventing press release button 220 from effecting release of latch 20 from buckle 30. Location of latch 20 in relation to buckle 30 is indicated at dashboard (control box) panel—FIG. 6.

1. When the illuminated off/on switch is ON there will be an amber coloured led light on.
2. When the off/on switch is ON and latch 20 is not engaged in buckle 20 the switch will show a red led light.
3. When the off/on switch is ON and latch 20 in engaged in buckle 30 and locking plate 250 is in first state the switch will show a green led light.

Another embodiment of the same invention uses a reed switch 290—FIG. 9 instead of a micro switch 280, which operates this way:

When the dashboard off/on switch is ON there is current to the reed switch 290—FIG. 9 fitted to the chassis 230 and a moveable permanent magnet 300—FIG. 9.

When the latch 20 is inserted into buckle 30 latch 20 moves the permanent magnet 300 so that the permanent magnet 300 is inline with the reed switch 290 thus switching the reed switch 290 to it's ON position and completing the circuit through to the solenoid 240 which then moves the lock 250 from said second state to said first state.

Please note: When using the reed switch 290 instead of the micro switch 280 all the other components and operations as described in the first embodiment remain the same. Please Note:

This Remotely Lockable Seat Belt Buckle will always revert back to being a standard seat belt buckle arrangement when the off/on switch is switched to the OFF position.

BRIEF DESCRIPTION OF DRAWINGS

Some aspects of the prior art and one or more embodiments of the present invention will now be described with reference to drawings in which:

FIGS. 5,6,7, and 8. Show the wiring diagrams.

Figure 1:
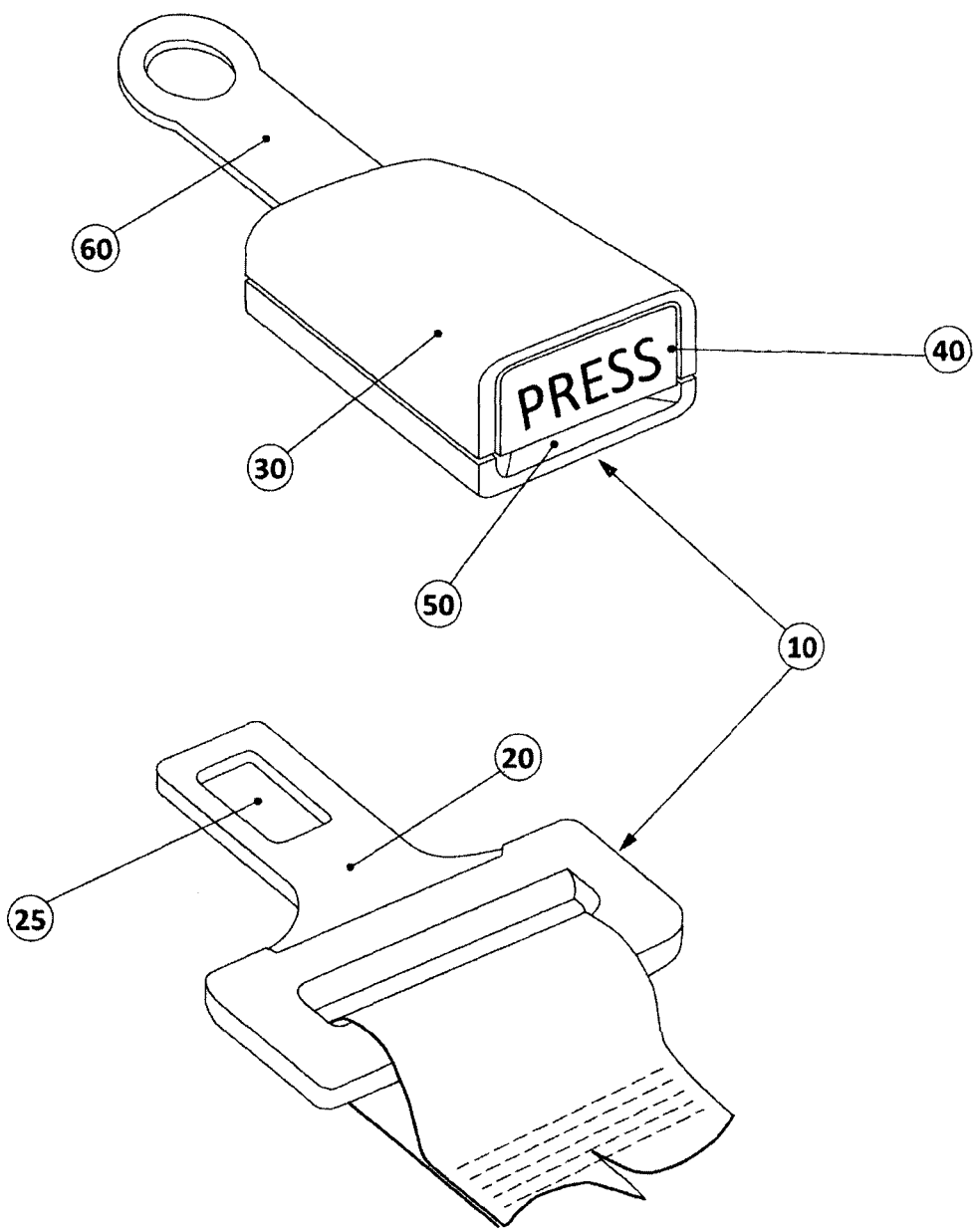
FIG. 1. Shows a prior art Seat Belt Buckle Arrangement.
Figure 2:
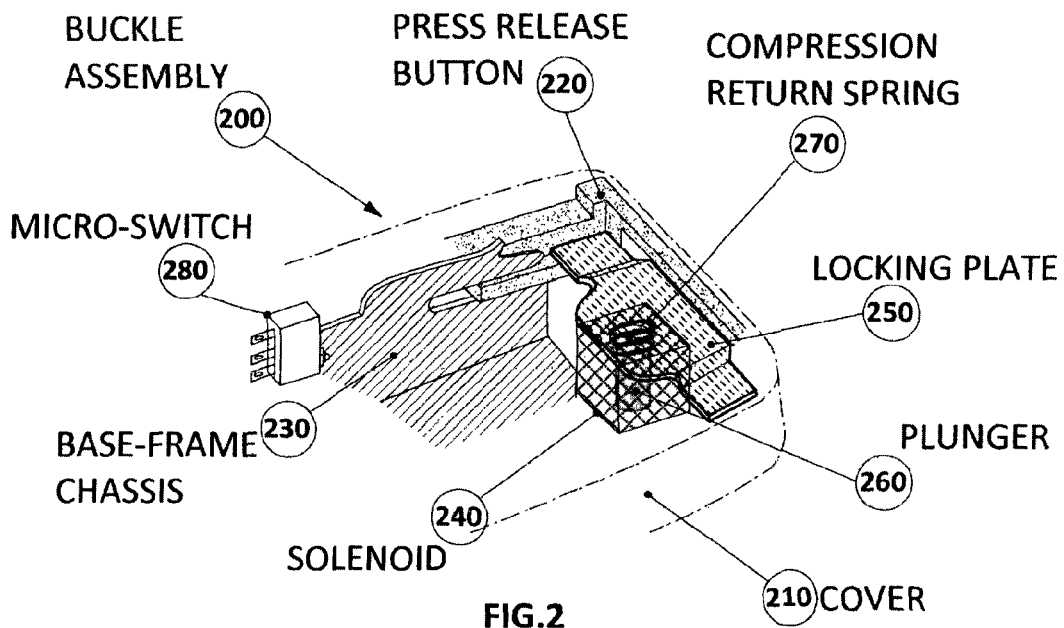
FIG. 2. Is a pictorial view of a remotely lockable seat belt buckle according to one embodiment of the present invention.
Figure 3A:
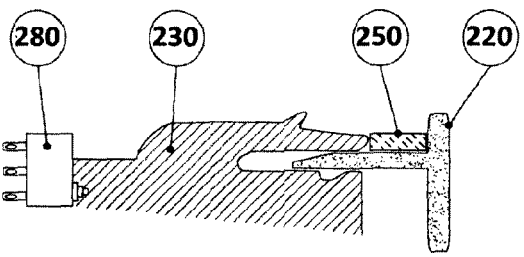
FIGS. 3a-3b. Show 2 sectional views of the seat belt buckle 30. (in a first position.)
Figure 4A:
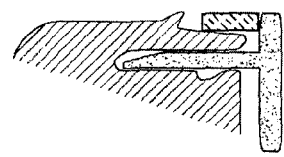
FIGS. 4a-4b. Show 2 sectional views of the seat belt buckle 30 (in a second position.)
Figure 3B:
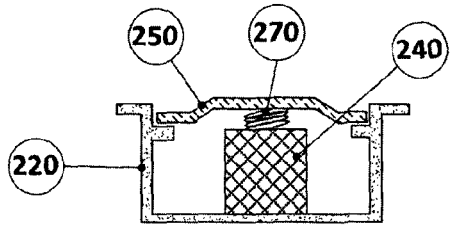
Figure 4B:
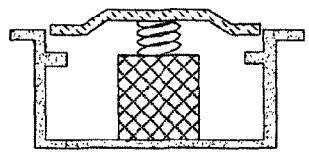
Figure 9:
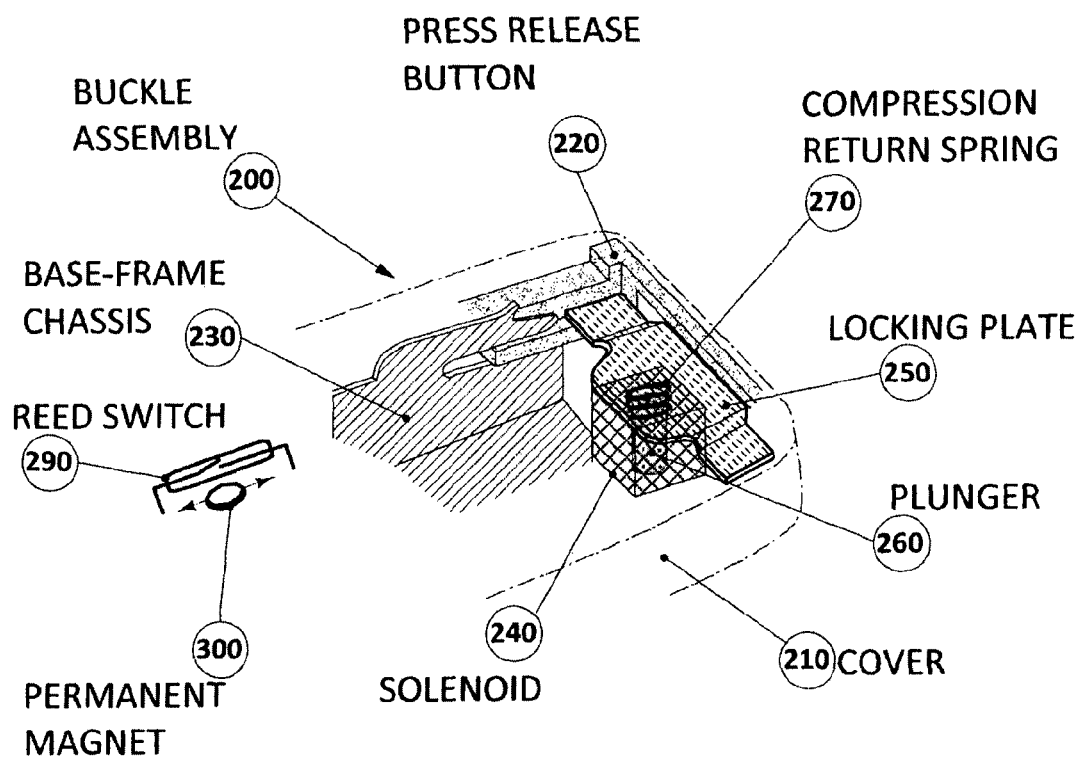
FIG. 9. Is a pictorial view of a remotely lockable seat belt buckle according to another embodiment of the present invention.

The claims defining the invention are as follows:
1. A seat belt arrangement comprising:
   a buckle configured to secure a latch when said latch is engaged with said buckle;
   release means associated with said buckle and being configured to allow release of said latch from engagement with said buckle upon action of said release means;
   a lock operatively associated with said buckle and said release means, said lock being configured to prevent activation of said release means in a first position of said lock, and to allow activation of said release means in a second position of said lock; and
   a switch configured in said buckle to be activated to dispose said lock in said first position, and be deactivated to dispose said lock in the second position;
   wherein said switch is activated by said latch when said latch is engaged with said buckle to dispose said lock in said first position, and is selectively deactivated upon activation of a remote activation means to dispose said lock in said second position.

2. The seat belt arrangement according to claim 1, further comprising;
   a chassis to accommodate the release means for action to allow the release of said latch from engagement with said buckle, said chassis normally biasing said release means to an inactive position from where said release means can be actioned to allow said release;
   wherein the lock comprises a solenoid, a locking plate operatively associated with the solenoid, and a biasing means configured to bias said locking plate to dispose said lock in said second position; and
   wherein said solenoid is able to be energised to move said locking plate to dispose said lock in said first position.

3. The seat belt arrangement according to claim 2, wherein an initial voltage is delivered to said solenoid to energise said solenoid and move said locking plate to dispose said lock in said first position, and then said initial voltage being reduced to hold said solenoid in said energised state and maintain said locking plate to dispose said lock in said first position with very low heat dissipation and low current for an indefinite period.

4. The seat belt arrangement according to claim 2, wherein said chassis includes a stop and said release means includes a stop confronting portion, whereby said release means is actioned to allow said release when said stop confronting portion proximately confronts said stop; said lock is disposed in said first position when said locking plate is moved to a position interposed between said stop confronting portion and said stop to prevent said stop confronting portion from proximately confronting said stop.

5. The seat belt arrangement according to claim 1, wherein said remote activation means is a remote switch configured within a vehicle comprising the seat belt arrangement.

6. The seat belt arrangement according to claim 1, further comprising an indicator to indicate whether said lock is in said first position or said second position.

7. The seat belt arrangement according to claim 1, wherein said lock moves to said second position upon opening an ignition switch of a vehicle comprising the seat belt arrangement.

8. The seat belt arrangement according to claim 1, wherein said switch is a micro-switch.

9. The seat belt arrangement according to claim 1, wherein said switch is a reed switch.

10. The seat belt arrangement according to claim 9, further comprising a magnet, said magnet being moved by said latch when said latch is inserted in said buckle to activate said reed switch.

11. A seat belt arrangement comprising:
a buckle configured to secure a latch when said latch is engaged with said buckle; a locking plate operatively associated with said buckle, said locking plate being configured to prevent release of said latch from engagement with said buckle in a first position and to allow release of said latch from engagement with said buckle in a second position; and
a switch configured in said buckle;
wherein said first position is determined through activation of said switch, and said switch being activated by said latch when said latch is engaged with said buckle.

12. The seat belt arrangement according to claim 11, further comprising a solenoid operatively associated with said locking plate, said solenoid being energised to move said locking plate to said first position.

13. The seat belt arrangement according to claim 12, wherein an initial voltage is delivered to said solenoid to energise said solenoid and move said locking plate to said first position, and then said initial voltage being reduced to hold said solenoid in said energised state and maintain said locking plate in said first position with very low heat dissipation and low current for an indefinite period.

14. The seat belt arrangement according to claim 11, wherein said switch is a micro-switch.

15. The seat belt arrangement according to claim 11, wherein said switch is a reed switch.

16. The seat belt arrangement according to claim 15, further comprising a magnet, said magnet being moved by said latch when said latch is engaged with said buckle to activate said reed switch.

17. The seat belt arrangement according to claim 11, further comprising:
a release means associated with said buckle and being configured to allow release of said latch from engagement with said buckle upon action of said release means; and
a chassis to accommodate the release means for action to allow the release of said latch from engagement with said buckle, said chassis normally biasing said release means to an inactive position from where said release means can be actioned to allow said release.

18. The seat belt arrangement according to claim 17, wherein said chassis comprises:
a stop and said release means includes a stop confronting portion, whereby said release means is actioned to allow said release when said stop confronting portion proximately confronts said stop;
wherein said lock is disposed in said first position when said locking plate is moved to a position interposed between said stop confronting portion and said stop to prevent said stop confronting portion from proximately confronting said stop.

* * * * *